United States Patent [19]

Grabovac

[11] Patent Number: 4,805,464

[45] Date of Patent: Feb. 21, 1989

[54] DIAL TORQUE WRENCH STRUCTURE

[75] Inventor: Bosko Grabovac, City of Arcadia, Calif.

[73] Assignee: Consolidated Devices, Inc., City of Industry, Calif.

[21] Appl. No.: 150,033

[22] Filed: Jan. 29, 1988

[51] Int. Cl.[4] ........................ G01L 5/24; B25B 23/159

[52] U.S. Cl. ................................ 73/862.26; 73/862.23

[58] Field of Search ......................... 73/862.26, 862.23; 81/477, 479; 340/688

[56] References Cited

U.S. PATENT DOCUMENTS

| | | | |
|---|---|---|---|
| 2,367,224 | 1/1945 | Larson et al. | 73/862.26 |
| 3,664,186 | 5/1972 | Kraus | 73/862.26 X |
| 3,726,134 | 4/1973 | Grabovac | 73/862.26 |

*Primary Examiner*—Charles A. Ruehl

[57] ABSTRACT

A dial torque wrench structure including an elongate rigid metal lever arm with a work-related front end and a manually engageable rear end. An elongate resilient metal deflection beam with front and rear ends is positioned adjacent to and parallel with the arm. The rear end of the beam is fixed to the arm. An elongate work-engaging head has one end fixed to the front end of the beam with the axis of the beam and head at right angle. A force-indicating dial mechanism is carried by the arm rearward of the beam and includes a gear-multiplying dial works with an input lever and an output shaft; a dial card with calibrations thereon; and, an elongate pointer on the shaft directed to the calibration and electrically-grounded to the arm. A conductor part adjacent the card with a contact post intersecting the plane through which the pointer moves. An elongate operating rod with front and rear ends is positioned adjacent the beam in parallel relationship therewith. The front end of the rod is fixed to the beam rearward of the head. An elongate coupling part is connected with and extends rearwardly from the rear end of the beam and engages the lever. Electric sound and light-emitting devices are carried by the arm in grounded relationship therewith. A battery power supply is carried by the arm. One terminal of the battery is connected with the conductor part. The other terminal of the battery is connected with power supply terminsl on said devices.

11 Claims, 3 Drawing Sheets

PRIOR ART
PRIOR ART

Fig. 6.
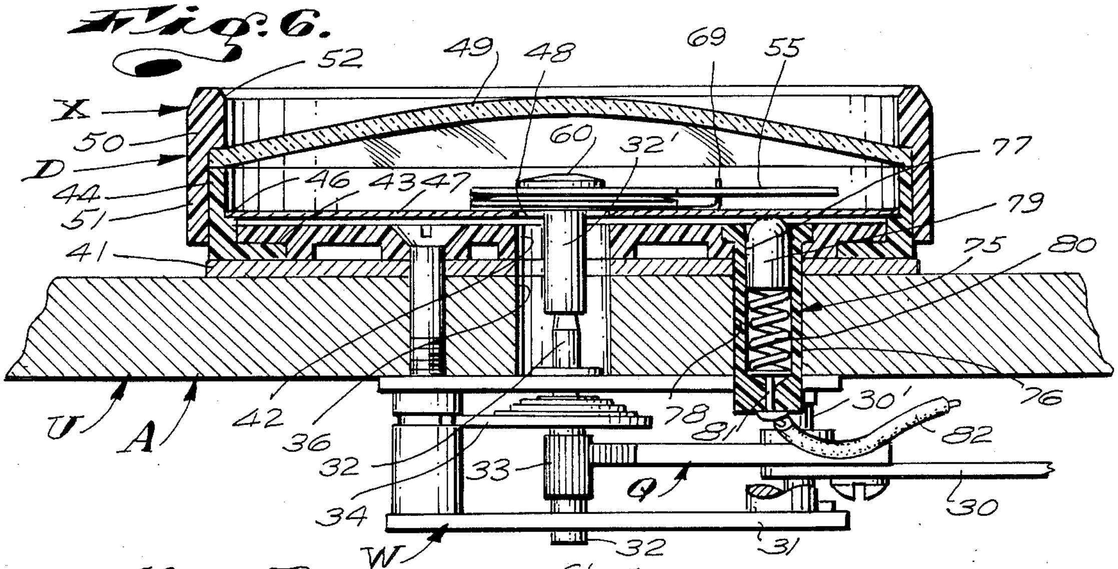
Fig. 7.
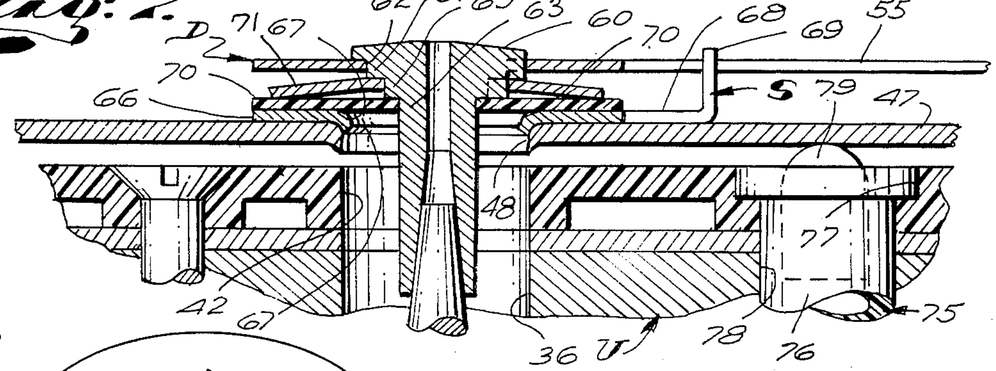
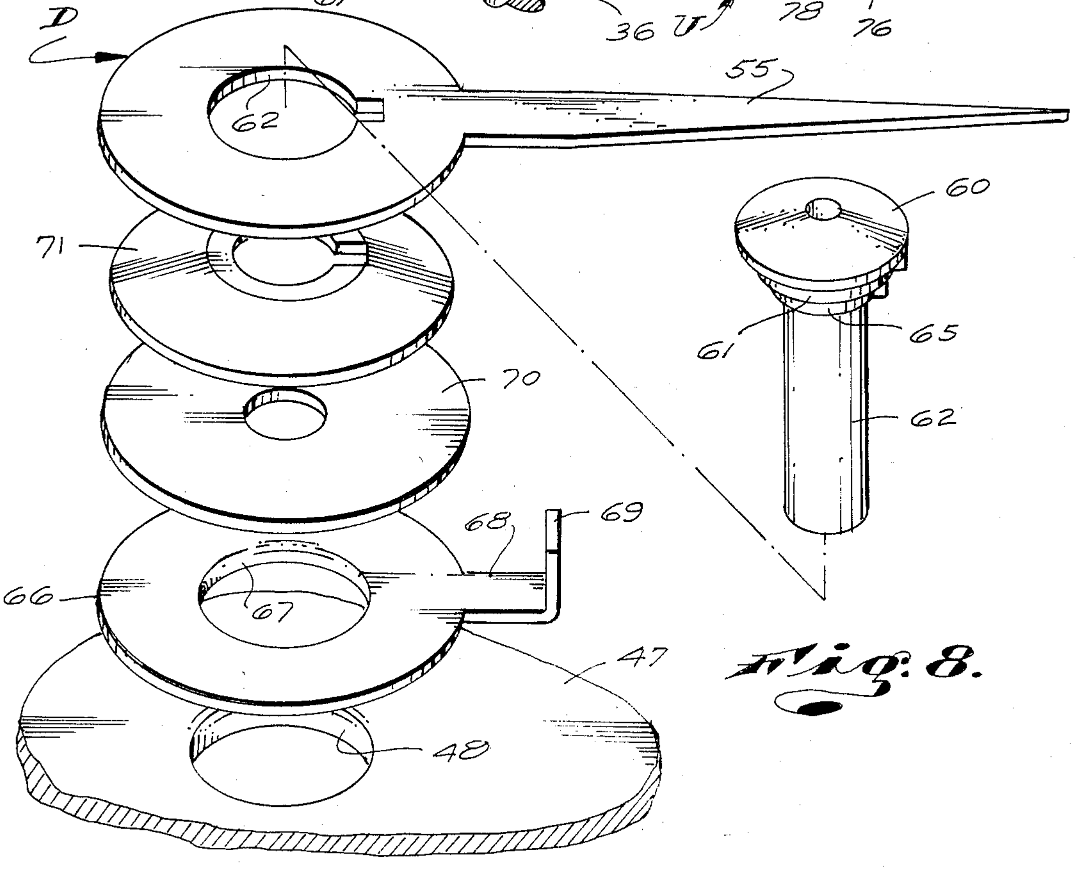
Fig. 8.

DIAL TORQUE WRENCH STRUCTURE

BACKGROUND OF THE INVENTION

The present invention has to do with improvements in that old and common form of dial torque wrench which is the subject matter of and is disclosed in my U.S. Pat. No. 3,726,134 for DIAL TORQUE WRENCH issued Apr. 10, 1973. The disclosure of the above noted patent is incorporated herein by reference.

The above-noted prior art wrench structure has been made and sold for in excess of fifteen years and has attained notable commercial success. The accuracy and dependability of that wrench structure has been equal to or superior than all known competitive wrench structures of a similar class. While the foregoing is true, it has long been recognized that the accuracy of that wrench diminishes markedly as forces applied through it are increased and approach the upper end of the operating range of the wrench. Another shortcoming found to exist in the noted prior art wrench resides in the frequent inability of the users of the wrench structure from gaining an effective viewing angle of the dial face and pointer so as to avoid inaccurate reading of the dial as a result of adverse parallax conditions.

Until recently, the above noted shortcomings in the noted prior art wrench have been considered to be inherent in the mechanics and/or dynamics of the structure and have been accepted as "givens" (in the vernacular).

In the recent past, as a result of ever-increasing demands for greater accuracy that threaten to adversely affect the utility of that wrench in certain industries and throughout important areas of the marketplace, repeatd detailed studies of that wrench structure have been undertaken. Those studies have disclosed that the principle cause of inaccuracies in that structure are caused by normally imperceptible, improper pivotal movement and swinging of the cantilever-supported operating rod that extends from the work-engaging head to the dial mechanism.

The noted cantilever-supported elongate operating rod in the noted prior art wrench structure functions to multiply slight lateral deflection of the beam and corresponding movement of the work-engaging head, in whichever direction the deflection beam might be deflected. Due to its great length, the operating rod tends to multiply deflections of the beam to such a degree that slight irregularities in deflection of the beam appear as major errors at the dial face of the dial means. For example, it has been determined that, due to the right angular relationship of the work-engaging head relative to the longitudinal axis of the deflection beam and the lever effect afforded thereby, upon normal use and operation of the wrench structure, the beam is not only deflected laterally (as intended) but is also subjected to what has been determined to be substantial torsional deflection. To the best of my knowledge and belief, the degree of torsional deflection of the deflection beam and resulting adverse displacement of the work-engaging head when bench testing that structure was so slight that it was never before recognized as presenting a meaningful factor and was summarily dismissed and/or ignored. In point of fact, it has been found that in regular field use of that structure, such torsional deflection of the deflection beam is often a major factor in imparting notable inaccuracies in that wrench structure which heretofore were believed to be brought about by the accumulated effect of irregularities built into the wrench structure, in spite of tight quality controls.

In addition to the foregoing, in normal use of the noted prior art wrench, the work-engaging head is subjected to great torsional forces and is often torsionally deflected to an extent to cause major misalignment of the operating rod and substantial error in the force indicated by the dial mechanism.

The two above-noted causes for error, though each might cause minor adverse effects, the effects of both are cumulative and such that substantial adverse effects are caused thereby.

It was determined that if the effect of torsional deflection of the head and the deflection beam in the above-noted prior art wrench structure was, for example, reduced by about 25%, the accuracy, effectiveness and utility of the resulting wrench structure would be materially greater than the noted prior art wrench structure and the resulting wrench would dependably meet or exceed those requirements for accuracy that are now in effect and those requirements that are likely to be implemented in the foreseeable future.

OBJECTS AND FEATURES OF THE INVENTION

An object of this invention is to provide an improved torque wrench structure that includes a combination of parts similar to that combination of parts that characterizes the prior art wrench disclosed in U.S. Pat. No. 3,726,134 but in which the operating rod is fixed to and extends rearwardly from the deflection beam instead of the head whereby error that would otherwise be caused by torsional deflection and lateral turning or displacement of the head are eliminated.

It is an object and a feature of this invention to provide an improved wrench structure of the general character referred to in the foregoing that includes improved electric-powered visual and/or audible signaling means to emit visual and/or audible signals when a predetermined set force is directed through the wrench structure and to thereby enable the wrench to be used in situations where the dial means of the wrench is obscured or cannot be effectively viewed by the operator of the wrench.

It is an object and a feature of this invention to provide a novel dial mechanism for the wrench structure with improved normally open, adjustable switch means for said signalling means.

Yet another object and feature of the invention is to provide a novel and improved drive-coupling means between the operating rod and the dial mechanism of the wrench which means includes a malleable, metal part that can be easily and conveniently bent to effect fine adjustment of the wrench structure.

The foregoing and other objects and features of the invention will be fully understood from the following detailed description of the invention, throughout which description reference is made to the accompanying drawings.

DESCRIPTION OF THE DRAWINGS

FIG. 6 is an enlarged, detailed sectional view of the dial mechanism taken substantially as indicated by line 6—6 on FIG. 1;

FIG. 7 is an enlarged, detailed sectional view of a portion of the structure shown in FIG. 6;

FIG. 8 is an exploded isometric view of selected related parts of the structure shown in FIG. 7;

DETAILED DESCRIPTION OF THE INVENTION

Figures 1, 2, 3, 4, 5:
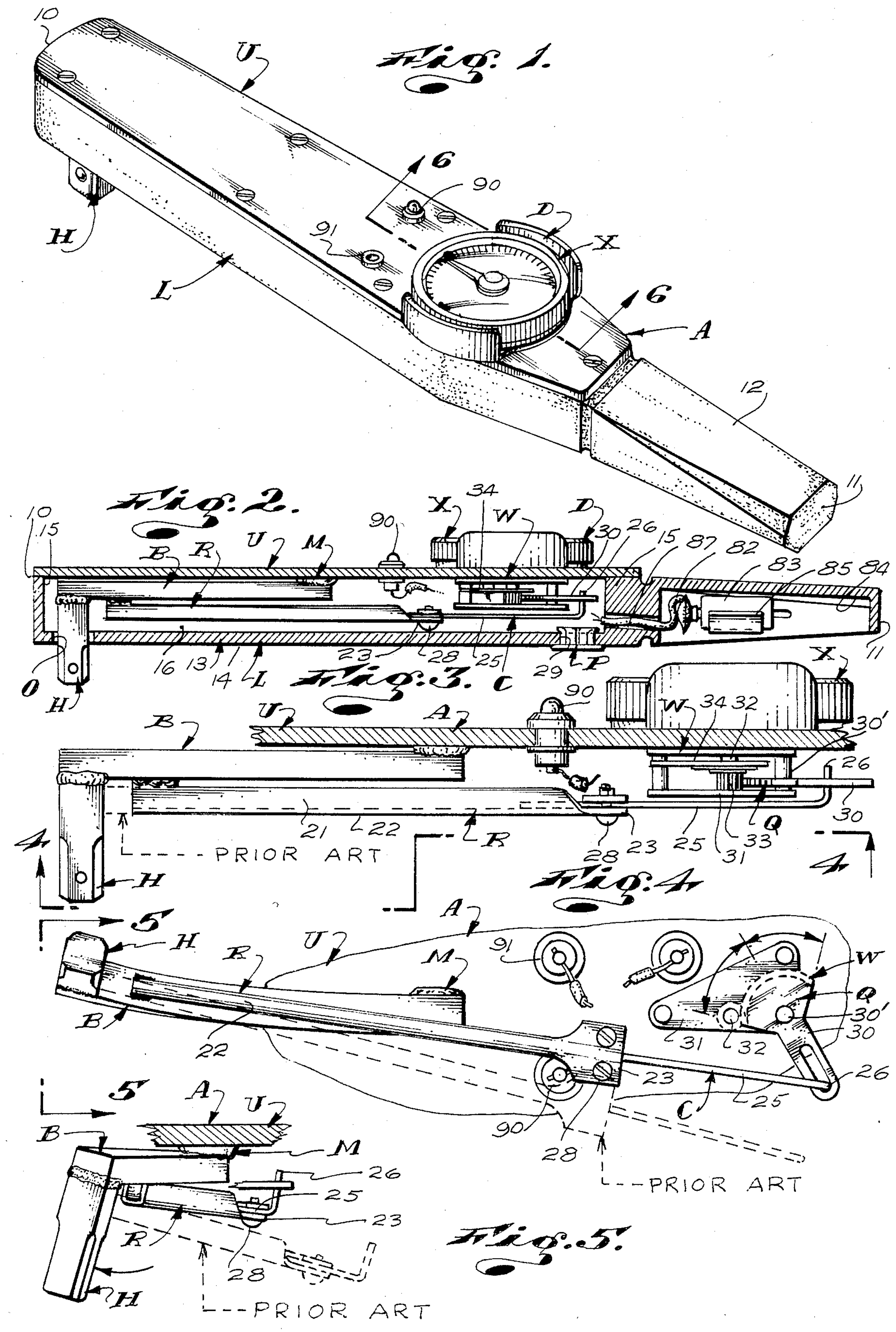
Fig. 5. PRIOR ART
FIG. 1 is an isometric view showing the top, one side and rear end of the wrench structure.
FIG. 2 is a longitudinal sectional view of the structure shown in FIG. 1.
FIG. 3 is an enlarged, detailed sectional view of a portion of the structure shown in FIG. 2.
FIG. 4 is a view taken substantially as indicated by line 4—4 on FIG. 3 and showing parts in another position.
FIG. 5 is a view taken substantially as indicated by line 5—5 on FIG. 4 and showing parts in another position.

The basic wrench structure of the present invention includes an elongate lever arm A, an elongate deflection beam B, mounting means M securing one end of the beam to the arm, a work-engaging head H fixed to the other end of the beam, an operating rod R fixed to the beam, a dial mechanism D carried by the arm, and coupling means C drivingly coupling the rod with the dial mechanism.

The above noted parts, means and mechanism are related so that the beam B is interposed between the work-engaging head H and the arm A so that forces exerted between the arm and the head are transmitted through the beam so as to yieldingly deflect or bend the beam in a predetermined manner.

The lever arm A is shown as a sectional structure including a normally horizontal, elongate lower body L and an upper plate U. In the preferred form of the invention and as shown, the elongate horizontal lower body L is a die-cast metal part with front and rear ends 10 and 11. The body defines an elongate manually-engagable handle at its rear end and an elongate front housing portion with a horizontal bottom wall 13 and vertical side and end walls 14 and 15 defining a normally upwardly-opening, longitudinally-extending compartment 16. The bottom wall 13 is formed with a vertical through-opening O at its front end portion to freely accommodate the work-engaging head H. The upper plate U is an elongate, flat, horizontal, rigid metal plate with flat top and bottom surfaces. The plate U is coextensive with and overlies the top of the housing portion of the body L to normally close the open top of the compartment 16 and is suitably screw-fastened to the body L whereby the parts L and U establish an integrated lever arm structure.

The beam B is a simple, normally straight, elongate horizontal bar of a suitably tempered, resilient steel alloy having predetermined stress and bending characteristics. The beam B has front and rear ends and is preferably rectangular in cross-section. The beam B is substantially less in longitudinal extent than the compartment 16 and is positioned within the compartment to extend longitudinally freely therein. The front end portion of the beam terminates in the compartment 16 above the noted opening O. The rear end portion of the beam is suitably fixed to the bottom surface of the plate U by the noted mounting means M. In practice, the mounting means M includes a shim or block positioned between the plate U and the rear end portion of the beam, and the beam, block and plate are suitably welded together, as shown. The block orients the beam relative to the plate so that the beam, forward of the block, is in close parallel working clearance with the plate and is free to be yieldingly deflected laterally, to the left or to the right, within the compartment 16 and relative to the plate.

The work-engaging head H can be of any suitable form and/or type of work-engaging part suitable to transmit torsional forces between the end of the beam B and a right angularly-related vertical screw fastener or the like. In the form of the invention illustrated, the head H is an elongate, vertically-extending, rigid metal part having upper and lower end portions. The head extends freely through the opening O in the body L of the lever with its lower end portion depending freely from beneath the front end of said lever. The upper end portion of the head extends upwardly in the compartment 16 to the front end portion of the beam B and is fixed to the beam as by welding.

In the form of the invention illustrated, the lower end portion of the head H is polygonal (square) in cross-section and is adapted to be slidably releasably engaged in a mating polygonal opening in a related fastener engaging drive socket or the like.

It is to be noted that when the wrench is in use, the head is subjected to torsional forces that tend to and often result in torsional deflection of the head.

Figure 9:
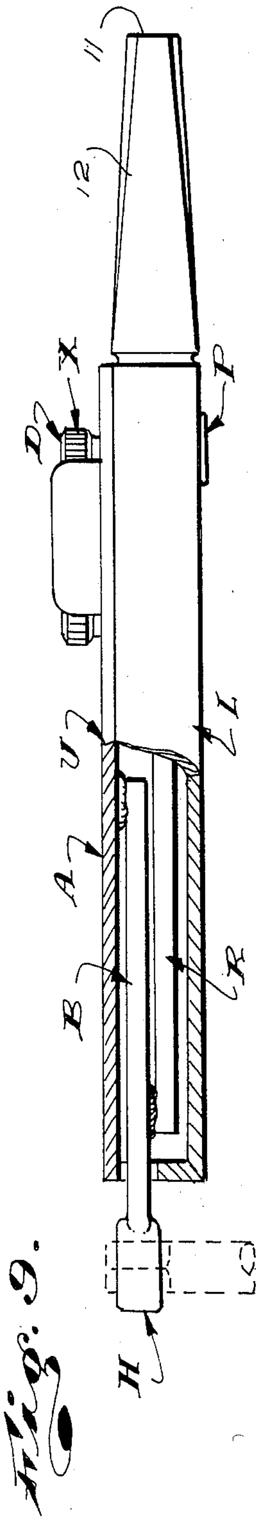
FIG. 9 shows a modified embodiment of the invention.

In another form and embodiment of the invention, as shown in FIG. 9 of the drawings, the opening O' in the body L' of the lever arm A' is established in the vertical front wall of the section L' and the work-engaging Head H' is an elongate, horizontal part having a rear portion fixed to the front end of the beam B' and projecting forwardly through the opening O' and a front end portion formed to engage work to be torqued about a vertical axis or to engage intermediate work-transmitting coupling parts, such as drive sockets, as desired or as circumstances require.

The second form of the invention described above is but one of several common or basic forms of work-engaging or work-coupling drive means utilized in click-type torque wrenches and is, as here employed, the full mechanical equivalent of corresponding structure embodied in the first and preferred embodiment of the invention.

The operating rod R is an elongate, horizontal metal part with front and rear ends. The rod R is made as rigid and non-yielding as is possible. In the form of the invention shown, the rod R is an elongate, horizontal, upwardly-opening channel section formed of sheet metal and suitably tempered. The rod R has flat, vertical, longitudinally-extending side walls 21 of substantial vertical depth and an intermediate semi-circular in crossssection bottom wall 22. The rear end portions of the side walls are bent or formed to extend horizontally and project radially outward from the opposite sides of the bottom wall and form a suitable mounting pad 23 for the coupling means C, as clearly shown in the drawings.

The front end portion of the rod R is securely mounted or fixed to the under or bottom side of the beam B at the front end portion thereof and so that it extends longitudinally rearwardly therefrom in close parallel working clearance therewith. The rear end portion of the rod extends rearwardly from the rear end of the beam into the rear portion of the compartment 16 of the lever arm A. The rod, as shown, occurs within the lower portion of the compartment 16 in close running clearance with the bottom wall 14 of the lever arm and normally occurs midway between and parallel with the side walls of the housing L. That is, the rod preferably normally occurs on and extends longitudinally of the central longitudinal vertical plane through the compartment 16 so that in use it is free to pivot or swing laterally to the left or to the right within the compartment (when looking rear to front).

The coupling means C comprises an L-shaped, adjustable malleable metal wire drive part 24 with a straight, elongate, horizontal leg 25 with front and rear ends and an elongate vertical finger 26 projecting upwardly from the rear end of the leg. The front end portion of the leg is seated on the inside of the bottom wall 22 of the rod and extends rearwardly across the mounting pad 23. The rear portion of the leg 25 is axially aligned with and projects freely from the rod, as an extension thereof. The means C next includes a clamp plate 27 overlying the pad and the portion of the leg 25 related thereto and screw fasteners 28, engaged through the plate and into the pad and holding the leg in set clamped engagement with the pad. The plate 27 can be loosened to allow for longitudinal shifting and adjusting of the drive part relative to the rod.

Finally, the means C includes a vertical access opening 29 in the bottom wall 14 of the lever arm and through which access to the drive part (from the exterior of the wrench structure) is had to enable engaging the leg and/or finger of the drive part with a screwdriver or between the nibs of a snip-nosed pliers to facilitate bending the malleable metal leg and/or finger and effect fine adjustment of the finger, longitudinally within the wrench structure. Such fine adjustment cannot be readily attained by longitudinal shifting of the drive past relative to the operating rod R during assembly of the structure.

In practice, the opening 29 is normally closed by a common, removable plug P.

It is to be noted that in wrench structures of the prior art, including L-shaped drive parts similar to the drive part here provided, the drive parts are made of hard, stiff, spring wire stock that cannot be effectively bent or otherwise worked on to effect fine adjustment of the position of the fingers of those parts by the forces that might be applied to the drive parts in set position within their assembled wrench structures. In the above-referred-to prior art wrench structures, adjustment of the noted drive parts can only be made by disassembling the wrench structures to an extent that free acces is afforeded to the screw fasteners that secure the drive parts to the operating rods and so that the screw fasteners can be loosened and the legs of the drive parts can be shifted longitudinally and set in desired position relative to the operating rods. In the prior art wrench structures, no access openings similar to the access opening 29 in the present invention are provided since such openings, if provided, would serve no useful end.

The establishing of the drive part of the means C of malleable metal rather than non-malleable spring metal, which heretofore was considered to be necessary, and to provide an access opening in the wrench structure to afford easy and quick access to the malleable metal drive part and to thereby enable fine adjustment of the wrench structure, without the need of disassembling the structure, has proven to be most advantageous and a meritorious advance in the art. That advance in the art has enabled "on-site" fine adjustment of the wrench and has materially reduced "down-time" otherwise required to effect disassembly and recalibration of the wrench structure at a suitable bench site.

The dial means D here provided is similar in most details of construction to a standard mechanical dial mechanism and includes a common drive works W. The drive works W includes a horizontally-disposed, large diameter input quadrant gear Q with a radially-extending, normally-rearwardly-projecting slotted lever 30. The quandrant gear is carried by a vertical shaft 30' rotatably mounted within a frame 31. An elongate vertical output shaft 32 is rotatably carried by the frame 31 and projects upwardly therefrom to a dial face assembly X. A small diameter pinion gear 33 is carried by the shaft and is in driving engagement with the quadrant gear Q. The gears Q and 33 are such that the drive works has a desired and suitable high turning radio. A clock spring 34, arranged about the shaft 32, is engaged with and between the shaft 32 and the frame. The spring 34 is normally unbiased and maintains the shaft is in its mean rotative position. The spring is normally unbiased and becomes biased upon rotation of the shaft in either a clockwise or counterclockwise direction. Upon rotation of the shaft from its means position, the spring yieldingly urges the shaft, and the whole of the mechanism D, back to its normal position and normally yieldingly maintains the mechanism in that position.

The structural and mechanical details of the drive works W of the mechanism D can vary widely without departing from the broader aspects and spirit of the present invention.

The frame F of the drive works W can be and is shown positioned within the rear portion of the compartment 16, rearward of the beam B and above the leg 25 of the drive part of the coupling means C. The frame is screw-fastened to and carried by the upper plate U of the arm A. The output shaft 32 projects upwardly and freely from the frame and into a vertical through-opening 36 in the plate U.

The dial face assembly X of the mechanism D includes a substantially flat, horizontal, disc-shaped base 40 positioned above the top of the plate U and is screw-fastened with the frame with the plate U in tight clamped engagement between the base 40 and the above-noted frame 31.

In the case illustrated, a flanged guard plate 41, which is provided to shield and/or guard the dial face assembly X, is shown positioned between the plate U and the base 40. Since the guard plate 41 can be eliminated without departing from or effecting the spirit of this invention, it will hereinafter be viewed as a part of the base 40 and no further reference thereto will be made.

The base 40 has a central, vertical opening 42 registering with the opening 36 in the plate U and through which the shaft 32 or an extension 32' engaged therewith freely projects.

The base 40 next includes a radially outwardly projecting retaining flange 43 about its perimeter.

The assembly X next includes an annular, cylindrical, sleeve-like carrier ring 44 rotatably engaged about the base 40. The ring 44 has an annular, radially inwardly projecting retaining lip 45, frictionally slidably engaged beneath the retaining flange 43. The ring 44 also has an annular dial face card seat 46 positioned above the top of the base 40. A flat, horizontally disc-shaped dial face card 47 is engaged within the ring with its outer peripheral edge set in fixed supported engagement on the seat 46. The dial face card 47 has a central opening 48, through which the vertical shaft extension 32′ freely projects.

The assembly X next includes a suitable, preferably concavo-convex disc-shaped crystal 49 positioned above the carrier ring 44 with its outer peripheral edge supported by the ring 44, an annular, cylindrical bezel ring 50 with a lower annular skirt portion 51 press-fitted about the exterior of the carrier ring 44, the ring 50 has a top rim portion 52 overlying the outer peripheral portion of the crystal and holding the crystal in fixed engagement with the ring 44.

The assembly X next includes an elongate dial needle or pointer 55 carried by the shaft extension 32′ and projecting horizontally radially therefrom, above the dial face card 47. The outer free end of the pointer 55 is normally directed toward and terminates adjacent a predetermined null mark (not shown) on the top surface of the card. In accordance with common practice, the top surface or face of the card is imprinted with right and left-hand series of calibration marks extending circumferentially clockwise and counterclockwise from the null mark and along which the tip of the pointer sweeps when the shaft 32 is caused to turn clockwise or counterclockwise in response to clockwise or counterclockwise torsional forces being directed onto and through the wrench structure in the course of normal and intended use of that structure. The circumferential movement of the tip of the pointer is proportional to the forces applied onto and through the wrench structure and the calibrations on the dial face card are established to indicate those forces applied through the wrench structure when the pointer tip is directed to them.

In practice, with the dial face structure here provided, the pointer tip can be normally directed to the null mark on the dial face card so that when the wrench is operated, the calibration to which the pointer tip is directed is that calibration which indicates the force applied. Alternatively, by engaging the bezel ring 50 of the assembly X and turning that ring, together with its related carrier ring and dial face card, the calibrations on the dial face can be moved so that the pointer tip, in its normal position, is directed to that calibration that indicates a predetermined force that is to be directed through the wrench structure and onto a related piece of work to be torqued. When the structure is thus set, upon operation of the wrench, the predetermined force is known to have been reached when the pointer tip is directed to the null mark.

Referring back to the relationship of the coupling means C and the dial mechanism D, the vertical finger 26 of the means C projects up from the rear end of the leg 25 of the drive part of the means C and projects upwardly through the slot in the slotted lever 30 of the quadrant gear Q to establish driving engagement with the lever. The finger 36 is slidable longitudinally in the slot to enable primary adjustment and/or calibration of the wrench structure and is slidable longitudinally in that slot during normal operation of the wrench structure.

In operation, when the front end of the deflection beam B is deflected laterally, to one side or the other, the rear end of the rod R carried by the beam and the coupling means C carried by the rod R swing or move laterally in the opposite direction, as clearly shown in FIG. 4 of the drawings.

When the foregoing movement of parts occurs, the finger 26 pivots the lever arm 30 laterally, turning the quadrant gear Q. The quadrant gear turns the spur gear 33 and the shaft 32. Upon turning of the shaft 32, the tip of the pointer, carried by the shaft 32, sweeps or moves along the calibrations on the dial face card.

During use and operation of the wrench structure here provided, it is important to note that, upon torquing a piece of related work, the primary turning forces conducted through the work-engaging head are resolved as lateral bending forces applied to the end of and thence longitudinally through the deflection beam. The beam B bends or deflects linearly between its ends. Further, secondary forces encountered during the operation of the wrench pivot or turn the head from vertical and direct torsional forces onto and through the deflection beam and result in undesired torsional deflection of the beam.

In FIGS. 4 and 5 of the drawings, the manner in which the deflection beam B is deflected, both laterally and torsionally, is shown. It is to be particularly noted that the extend or degree to which the beam B is shown deflected has been greatly exaggerated in order to best illustrate the invention. In practice, the degree or extent to which the beam B of the wrench structure might be deflected when subjected to rather light and properly directed operating forces is often substantially imperceptible to the naked eye and can only be visually detected by movement of the rear or free end of the operating rod R, where the movement or deflection of the beam is greatly multiplied, and at the dial face of the mechanism D where that movement is further multiplied.

In FIGS. 3, 4 and 5 of the drawings, the structure of this invention shown in full lines and structure embodying the teachings of the prior art is shown in dotted lines for the purpose of comparison and is appropriately identified as PRIOR ART.

Showing that which is taught by the prior art in dotted lines and in association with the full line drawings of the invention is a drafting privilege which is deemed appropriate in the case at hand since it makes the mechanical advantages afforded by this invention over the teachings of the prior art most apparent and graphically clear. Those advantages are not subject to being clearly expressed and/or perceived in words alone.

Referring to FIGS. 2 through 5 of the drawings, it will be apparent, as previously noted, that the front end of the rod R is fixed to the beam B, not to the head, as in the prior art. For the purpose of this disclosure, the front end of the rod R is shown to be fixed to the beam B, a short distance from the head. When the front end of the beam is deflected or moved laterally to the right relative to its fixed rear end, as shown in FIG. 4 of the drawings, the longitudinal axis of the beam is arcurately curved. When the beam is thus deflected, its forward portion moves to the right, and the operating rod, the front of which is fixed to the forward position of the beam and which is normally aligned with and projects rearwardly from the beam, is moved or swings to the right, with the beam and its longitudinal axis is turned so that its rear end and the finger 26 of the means C related to it swing to the left and drive the dial works W of the dial means D.

Referring to FIGS. 3 and 4 of the drawings and comparing the structure of the present invention, shown in full lines, with comparable prior art structure, shown in dotted lines, the following is to be noted. In the prior art structure, the operating rod is fixed to and carried by the workengaging head at the front end of the beam. Upon deflection of the beam, the front end of the prior art operating rod is moved or swung laterally with the head, and the angular displacement of the head results in corresponding angular displacement of the rod R and means C of the present invention.

In addition to the foregoing, angular displacement of the rod is caused by torsional deflection of the head that has occurred.

Referring to FIG. 5 of the drawings, I have shown the deflection beam B, rod R, and coupling means C deflected and/or moved laterally as in FIG. 4 of the drawings and have further shown the beam B torsionally deflected and the rod R and coupling means C moved from alignment with the beam as a result of torsional deflection of the beam. In FIG. 5 of the drawings, the front end of the beam is shown deflected laterally to the same extent that the beam B is deflected laterally in FIG. 4 of the drawings. In addition, the beam is shown torsionally deflected as it might in practice be torsionally deflected when being deflected laterally to the right. It is to be noted that torsional biasing or deflection of the beam results in a secondary rearward and downward angular displacement of the rod R and of the means C and is such that the rear-most finger 26 is moved downwardly a substantial distance. In addition thereto, the rod R and means C are turned or rotated axially so that the normally vertical finger 26 is inclined laterally outwardly and upwardly. Such inclination of the finger results in additional lateral outward movement or displacement of the upper end of the finger that engages and drives the dial works W of the dial mechanism D.

In practice, the above noted downward displacement and turning of the rod R and of the means C caused by torsional deflection of the beam B imparts into the wrench structure inaccuracies that cannot be anticipated, corrected or compensated for. Those inaccuracies resulting from slight (normally encountered) torsional deflection of the beam B are often minor and within permissible limits. However, when, for numerous reasons, excessive torsional deflection of the beam occurs (which is seldom, if ever, perceived by the operator of the wrench), the noted inaccuracies become excessive and result in totally unacceptable errors that render the wrench structure inherently unreliable. For example, one typical manner in which the beam in this or similar wrench structures is torsionally biased to an excessive extent is when a socket wrench extension part is engaged between the work-engaging head of the wrench and a related fastener-engaging drive socket, and the socket, extension and wrench assembly is engaged with a fastener to be torqued. Thereafter, the manual forces applied to the wrench are misdirected in such a manner that the whole of the noted assembly is misaligned with the fastener (the reaction part) so as to, in effect, bend or move the fastener from its set axial disposition. In such a case, the assembled work-engaging head, extension and socket create a substantial or long lever arm capable of torsionally deflecting the deflection beam B to a substantial and excessive extent with relatively little applied force.

In the present invention, as graphically shown in full lines in FIG. 5 of the drawings, it will be apparent that the extent of downward and lateral outward inclination of the rod R and coupling means C is greatly reduced and is but a fraction of the extent of downward and lateral outward inclination of the corresponding prior art rod and coupling means.

In addition to the above, the downward and lateral outward angular displacement of the finger 26 of the means C in my invention is materially less than occurs in the noted prior art structure.

In practice, each percentage point of reduction of the adverse affects of torsional deflection of the head and deflection beams in wrenches of the class here concerned with is significant. The reduction of such adverse affects I have attained by fixing the rod to the beam rather than to the head has proven to be a major improvement that results in a wrench structure having a high degree of dependability and reliability unattainable by prior art wrench structure of the same class.

Referring again to the dial mechanism D, that mechanism embodies a novel, normally open, electric switch means S. The subassembly comprising the frame 31, shaft 32, extension 32' and the pointer 55, is an electrically conductive assembly of metal parts. The lever arm structure A is an electrically conductive metal structure. Accordingly, the pointer 55 is effectively grounded to the arm A by the dial works W and in the instant invention serves as an electric switch contact. The pointer 55 can, therefore, be properly called a contact-pointer.

The carrier ring 44 of the dial assembly X is a dielectric part which, in practice, is molded of a suitable plastic material.

The dial face card 47 of the assembly X is established of an electrically conductive metal, such as sheet brass, and will be called as a conductor card. The conductor card is carried by the ring 44 in spaced electrically isolated relationship below the contact pointer 55. The shaft extension 32' extends freely upwardly through the opening 48 in the conductor card in non-contacting relationship therewith.

The contact-pointer 55 is carried by an enlarged hub part 60 formed integrally on the upper end of the extension 32'. The hub part 60 has a large diameter upper end portion 61 press-fitted in an opening 62 formed in the inner end of the contact pointer 55, the part 60 has a lower, small diameter portion 63 defined by the upper end portion of the shaft extension 32', and an intermediate portion 65 between the portions 61 and 63 which is smaller in diameter than the portion 61 and larger in diameter than the portion 63. The portions 65 and 61 define annular downwardly disposed stop shoulders and the portion 61 is shown provided with a radially outwardly projecting annular stop flange about its upper outer edge to engage and prevent vertical displacement of the contact pointer 55.

The structure that I provide next includes a thin, flat, horizontally disposed, annular contact washer 66 in flat sliding supported contact with the top of the contact card 47, with its central opening 67 concentric with the opening 48 in the card. The contact washer has a radially outwardly projecting tab 68 with a vertically upwardly projecting contact post 69 at its outer or free end. The post 69 projects upwardly through the horizontal plane on which the contact pointer 55 occurs and is such that, upon suitable rotation or turning of the contact pointer and/or rotation of the washer, the contact pointer and the post move into and out of engagement with each other.

The dial mechanism structure I provided next includes a thin, flat, horizontal annular insulating disc 70 that is engaged about the portion 63 of the hub part 60 and overlies the contact washer 66 in sliding frictional engagement therewith. The disc 70 is made of a dielectric plastic material having a low coefficient of friction with the washer 66.

The structure next includes an annular spring part 71 engaged about and carried by the intermediate portion 65 of the hub part 60 and engaging the top of the disc 70 to normally yieldingly urge and hold the disc and the washer 66 down, with the washer in sufficiently tight frictional contact with the dial face to normally prevent free turning of the washer relative to the dial face yet allowing the washer 66 to be forcibly turned or rotated by that force that can be directed onto the washer by the contact pointer 55 (through the tab 68 and post 69).

The dial mechanism D that we provide next includes a brush-type contact device 75 carried by the base 40 and engaging the bottom surface of the dial face contact card 47. The device 75 includes an elongate vertically-extending tubular carrier part 76 of dielectric material. The carrier part has an upper end portion securely engaged in an opening 77 in the base and a lower portion depending through an opening 78 in the upper plate U of the lever arm A and into the chamber 16 of said arm. The device 75 next includes an elongate brush part 79 slidably engaged in the upper portion of the carrier and projecting upwardly therefrom and slidably engaging the downwardly disposed bottom surface of the card 47. The device 75 next includes a compression spring 80 within the carrier and acting between the brush 79 and a shoulder in the lower portion of the carrier and yieldingly urging the brush up into contact with the card. Finally, the device 75 includes a terminal part 81 depending from the lower end of the spring to the exterior of the carrier. The terminal part 81 is shown suitably connected with one end of an elongate, insulated first power line 82.

It will be apparent that the dial assembly X described and shown embodies a novel, normally open electric switch means S. When the wrench structure is to be used to apply a predetermined force on a piece of related work, the carrier ring 40 is manually rotated (clockwise or counterclockwise, as circumstances require) relative to the base 40 and so as to turn the dial card 47 and the contact washer 66 until the contact post 68 engages and stops against the contact pointer 55 (which is in its normal relative or nulled position). Thereafter, the ring 40 and card 47 are rotated further and relative to the stopped contact post 68 and washer 66 until the calibration on the upper surface of the dial card that indicates the force to be applied is in register with the contact pointer. Thereafter, the carrier ring 40, card 47, washer 66 and its contact post 69 are manually rotated in a reverse direction to reset the null mark on the dial face card in register with the contact pointer. Thereafter, when the wrench is put to use and the pointer is caused to rotate the contact pointer 55, the contact pointer 55 engages the contact post 69, closing the switch means S when the predetermined set force applied through the wrench structure is reached.

The structure that I provide next includes a power supply in the form of a battery 83. The battery 83 might b suitably mounted within the compartment 16 of the lever arm structure and access thereto might be afforded through a normally closed access opening established in the forward portion of the lower section L of the arm A. In the form of the invention shown, the battery is positioned within a downwardly opening cavity 84 formed in the rear handle portion 12 of the lower body section L. The battery is releasably retained within the cavity 84 by a sheet metal clip 85 which snaps or is removably press-fitted in the cavity. One terminal of the battery which is to be grounded to the arm A through and by means of the switch means S of the dial mechanism D, that terminal is suitably connected with the first power line 82 that extends from the device 75 through the cavity 16 and thence through a passage in the rear wall 15 of the body section L and into the cavity 84. The other terminal of the battery is connected with one end of a second power line 87. The second power line 87 extends from the battery through the passage and into the chamber 16 and is connected with a power supply terminal of a signal lamp device or unit 90 and/or to the power supply terminal of an electric sound-emitting buzzer or horn device or unit 91. When both lamp and horn devices are provided, the powerline 87 is series-connected to the power supply terminals thereof. The lamp 90 and/or horn 91 are suitably ground-connected to the lever arm A.

Figure 10:
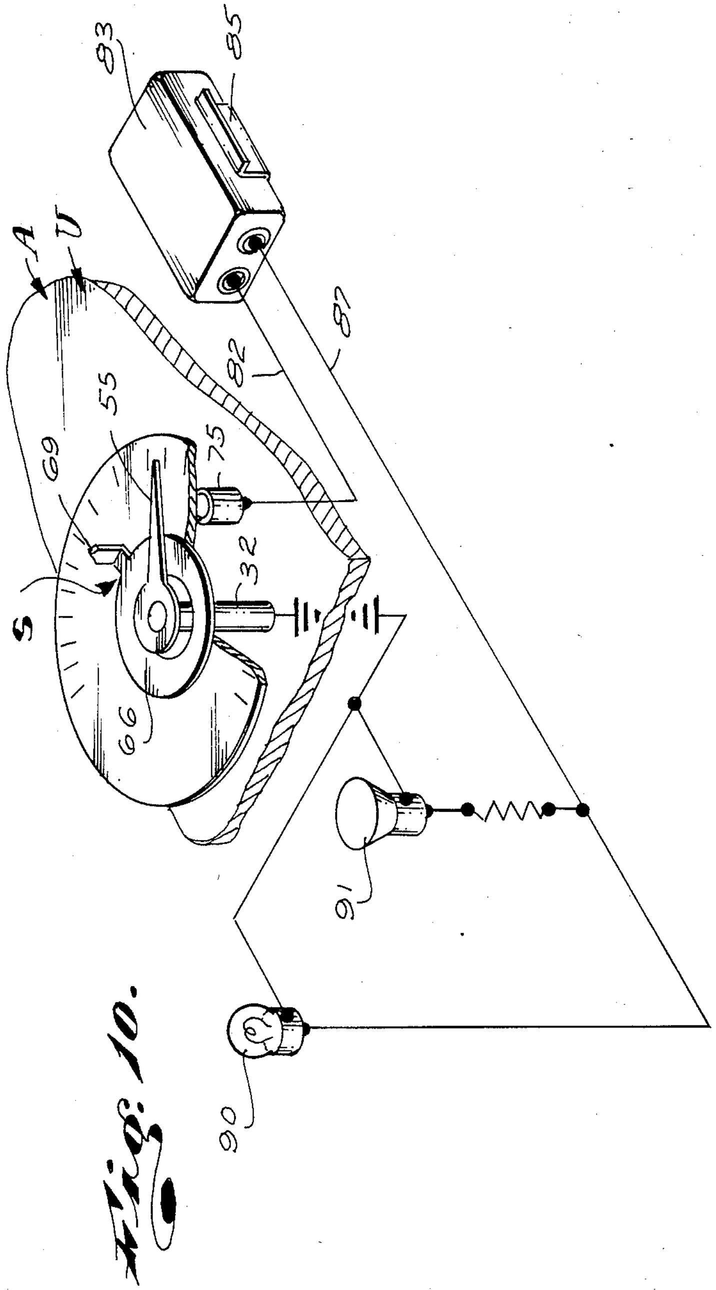
FIG. 10 is a diagramatic illustration of the electric circuit.

The above circuit is diagramatically shown in FIG. 10 of the drawings.

The lamp device 90 and/or horn device 91 include elongate vertically-extending cylindrical cases 92 and 93. The cases 92 and/or 93 are engaged through suitable related port 94 formed in the upper plate section U of the lever arm A in electrically-grounded relationship thereto and are releasably retained therein by suitable flanges and nut parts, in accordance with common practice. The devices 90 and 91 are standard, commercially available signalling devices.

The lamp device 90 and/or the horn device 91 are positioned in close proximity to the dial face assembly X where the lamp can be conveniently viewed at the top of the wrench structure from various angles and/or where sound emitted by the horn is emitted in directions from the top of the wrench structure in such a manner that it is unlikely to be adversely muffled.

In practice, it is preferred that both of the signalling devices, that is, the lamp device 90 and horn device 91, be provided.

With the electric circuit and the various components and parts thereof described above and shown in the drawings, it will be apparent that when the wrench structure is set to effect closing of the switch means S at a predetermined set force and the wrench is operated to move the contact pointer 55 into closed or contacting engagement with the contact post 68, the lampo device 90 and/or horn device 91 are energized, thus visually and/or audibly apprising the operator of the wrench that the set operating force has been reached or attained.

The electric visual and audible signalling means here provided enables the operator of the wrench to effectively operate the wrench without having to position his head above the dial face card in order to attain a direct or aligned view of the dial face and thereby properly and effectively read the dial (free of adverse parallax and the like). Thus, the wrench structure can be used in those often encountered situations where the dial face cannot be effectively viewed and read and where the wrench structure, without the electric signalling means here provided, could not be used.

In point of fact, the electric signalling means here provided enables the operator of the wrench to position himself relative to the wrench and to direct his attention and skill to the direction in which he applies forces onto and through the wrench and to thereby avoid misdirecting those forces in a manner that is likely to result in undesired torsional deflection of the deflection beam.

Such attention and operation of a wrench often cannot be exercised where the operator is required to assume awkward and contorted positions in an effort to attain appropriate aligned view of the dial face.

In accordance with the above, there exists a direct and important cooperative relationship with and between my combination and relationship of the deflection beam and operating rod that reduces the adverse effects of torsional deflection of the beam and the electrical signalling means which enables the operator of the wrench to direct forces onto and through the wrench which do not or are less likely to result in torsional deflection of thee deflection beam.

Having illustrated and described typical, preferred embodiments of my invention, I do not wish to be limited to the specific details herein set forth but wish to reserve to myself any modifications and/or variations that might appear to those who are skilled in the art and which fall within the scope of the following claims.

Having described my invention, I claim:

1. A dial torque wrench structure comprising an elongate, horizontal rigid metal lever arm with front and rear ends, a hand grip projecting rearwardly from the arm, an elongate resilient metal deflection beam with front and rear ends in spaced parallel relationship with the arm, mounting means fixing the rear end of the beam to the arm, an elongate vertically-extending resilient metal work-engaging head, the head has an upper end fixed to the front end of the beam and a lower end portion depending freely from the beam, a multiplying gear dial works is positioned rearward of the beam and fastened to the arm, said dial works includes an elongate horizontal, pivotally movable input lever and a vertical rotatable output shaft, a dial face assembly including a horiziontal dial face card with an annular series of force-indicating calibrations thereon is carried by the arm with said calibrations concentric with said shaft, an elongate pointer is carried by the shaft and is directed toward said calibrations, an elongate horizontal operating rod with front and rear ends is positioned in working spaced parallel relationship with the beam, the front end of the rod is fixed to the beam at a point spaced rearward from the work-engaging head, a drive coupling means is positioned between the rear end of the rod and the lever, said coupling means includes an elongate drive part carried by and projecting rearwardly from the rod, said drive part has a vertically-extending finger in driving engagement with said lever.

2. The structure set forth in claim 1 wherein the drive part has an elongate horizontal leg projecting forward from the finger, said coupling means includes screw means releasably holding the front portion of the leg in set position longitudinally of the rod with said finger in set position longitudinally of the lever.

3. The structure set forth in claim 1 wherein the drive part has an elongate horizontal leg projecting forwardly from the finger, said coupling means includes screw means releasably holding a front portion of the leg in set position longitudinally of the rod with said finger in set position longitudinally of the lever, the drive rod is made of malleable metal wire and is such that said leg and finger can be manually bent to effect fine adjustment of the position of the finger relative to the lever.

4. The structure set forth in claim 1 wherein the arm defines an elongate compartment within which the beam, upper end portion of the work-engaging head, dial works, operating rod and coupling means are positioned.

5. The structure set forth in claim 1 wherein the arm defines an elongate compartment within which the beam, upper end portion of the work-engaging head, dial works, operating rod and coupling means are positioned, the arm has an access opening affording access to the drive part within the compartment to enable manual bending thereof, a plug is removably engaged in and normally closes the access opening.

6. The structure set forth in claim 1 wherein the arm defines an elongate compartment within which the beam, upper end portion of the work-engaging head, dial works, operating rod and coupling means are positioned, the drive part has an elongate horizontal leg projecting forwardly from the finger, said coupling means includes screw means releasably holding the front end portion of the leg in set position longitudinally relative to the rod, the drive part is made of malleable metal wire and is such that said leg and finger can be manually bent to effect fine adjustment of the position of the finger relative to the lever, the arm has an access opening affording access to the drive part to effect bending thereof, a plug is removably engaged in and normally closes the access opening.

7. The structure set forth in claim 1 wherein said pointer is a switch contact part and is grounded to the arm through said dial works, said dial face card is a conductive part, a conductor washer is slidably engaged with said card and is insulated from the pointer, arm and dial works, the washer has a contact post projecting therefrom and intersecting the horizontal plane through which the pointer moves, the washer is movable relative to the card to selectively adjust the position of the post circumferentially of the calibrations, a contact device is carried by the dial face assembly and slidably engages the card, a power supply battery is carried by the arm, a first conductor line is fixed to and extends between the contact device and one terminal of the battery, a signal lamp device is carried by and is grounded to the arm, a second power line extends from the other terminal of the battery to a power supply terminal of the lamp device, said lamp is energized when said pointer contacts said post.

8. The structure set forth in claim 1 wherein said pointer is a switch contact part and is grounded to the arm through said dial works, said card is a conductive part, a conductor washer is in sliding contact with the card and has a contact post projecting therefrom and intersecting the plane through which the pointer moves, the washer is rotatable relative to the card to selectively adjust the position of the post circumferentially of the calibrations, a contact device is carried by the dial face assembly and slidably engages the card, a power supply battery is carried by the lever arm, a first conductor line is fixed to and extends between the contact device and one terminal of the battery, an audible signal-emitting device is carried by and is grounded to said arm, a second power line extends from the other terminal of the battery to a power terminal of said signal-emitting device, said signalemitting device is energized when the pointer contacts the post.

9. The structure set forth in claim 1 wherein said pointer is a switch contact part and is grounded to the arm through said dial works, said dial face card is a conductive part, a conductor washer is slidably carried by the card and has a contact post projecting therefrom and intersecting the plane through which the pointer moves, the washer is rotatable relative to the card to selectively set the position of the post circumferentially of the calibrations, a contact device is carried by the dial face assembly and slidably engages the card, a power supply battery is carried by the arm, a first conductor line is fixed to and extends between the contact device and one terminal of the battery, electric light and sound-emitting devices are carried by and grounded to the arm, a conductor line extends from a terminal of the battery and is series-connected with power supply terminals of the signal-emitting devices, said signal-emitting devices are energized when the pointer contacts the post.

10. The structure set forth in claim 1 wherein said pointer is a switch contact part and is grounded to the arm through said dial works, said dial face card is a conductive part, a conductor washer is slidably carried by the card and has a contact post projecting therefrom and intersecting the plane through which the pointer moves, the washer is rotatable relative to the card to selectively set the position of the post circumferentially of the calibrations, a contact device is carried by the dial face assembly and slidably engages the card, a power supply battery is carried by the arm, a first conductor line is fixed to and extends between the contact device and one terminal of the battery, electric light and sound-emitting devices are carried by and grounded to the arm, a conductor line extends from a terminal of the battery and is series-connected with power supply terminals of the signal-emitting devices, said signal-emitting devices are energized when the pointer contacts the post, the drive part has an elongate, horizontal leg projecting from the finger, said coupling means includes screw means releasably holding a front end portion of the leg in set position longitudinally of the rod, said part is made of malleable metal wire and is such that said leg and finger can be manually bent to effect fine adjustment of the position of the finger longitudinally relative to the crank.

11. The structure set forth in claim 1 wherein said pointer is a switch contact part and is grounded to the arm through said dial works, said dial face card is a conductive part, a conductor washer is slidably carried by the card and has a contact post projecting therefrom and intersecting the plane through which the pointer moves, the washer is rotatable relative to the card to selectively set the position of the post circumferentially of the calibrations, a contact device is carried by the dial face assembly and slidably engages the card, a power supply battery is carried by the arm, a first conductor line is fixed to and extends between the contact device and one terminal of the battery, electric light and sound-emitting devices are carried by and grounded to the arm, a conductor line extends from a terminal of the battery and is series-connected with power supply terminals of the signal-emitting devices, sais signal-emitting devices are energized when the pointer contacts the post, the arm defines an elongate compartment within which the beam, upper end portion of the work-engaging head, dial works, operating rod and coupling means are positioned, the drive part has an elongate, horizontal leg projecting forwardly from the finger, said coupling means includes a screw means releasably holding a front end portion of the leg in set position longitudinally relative to the rod, the drive part is made of malleable metal and is such that said leg and finger can be manually bent to effect fine adjustment of the position of the finger longitudinally of the lever, the arm has an access opening adjacent and affording access to the drive part to effect bending thereof, a plug is removably engaged in and normally closes the access opening.

* * * * *